United States Patent [19]
Bolen

[11] Patent Number: 5,061,195
[45] Date of Patent: Oct. 29, 1991

[54] CLOCK SPRING HOUSING AND ASSEMBLY

[75] Inventor: Pat A. Bolen, Carthage, Ill.

[73] Assignee: Methode Electronics, Inc., Chicago, Ill.

[21] Appl. No.: 567,716

[22] Filed: Sep. 24, 1990

[51] Int. Cl.5 .............................................. H01R 37/02
[52] U.S. Cl. ...................................... 439/164; 439/15
[58] Field of Search ................. 437/15, 164; 74/485 R

[56] References Cited

U.S. PATENT DOCUMENTS

| 4,633,931 | 1/1987 | Kurata | 435/15 X |
| 4,722,690 | 2/1988 | Priede | 439/15 |
| 4,744,763 | 5/1988 | Suzuki et al. | 439/15 |
| 4,875,860 | 10/1989 | Suzuki | 439/15 |

OTHER PUBLICATIONS

U.S. Patent Application Ser. No., 07/592,812 by Pat A. Bolen, "Clock Spring Housing with Reusable Locking Means".

Primary Examiner—Eugene F. Desmond
Attorney, Agent, or Firm—Allegretti & Witcoff, Ltd.

[57] ABSTRACT

A clock spring assembly useful in maintaining an electrical connection between a rotating and stationary electrical device the clock spring assembly comprising a hub, a housing, a retainer, and a coiled conducting means. The hub is rotatably associated with the housing at a single bearing. The hub is attached to the housing by a locking means.

7 Claims, 2 Drawing Sheets

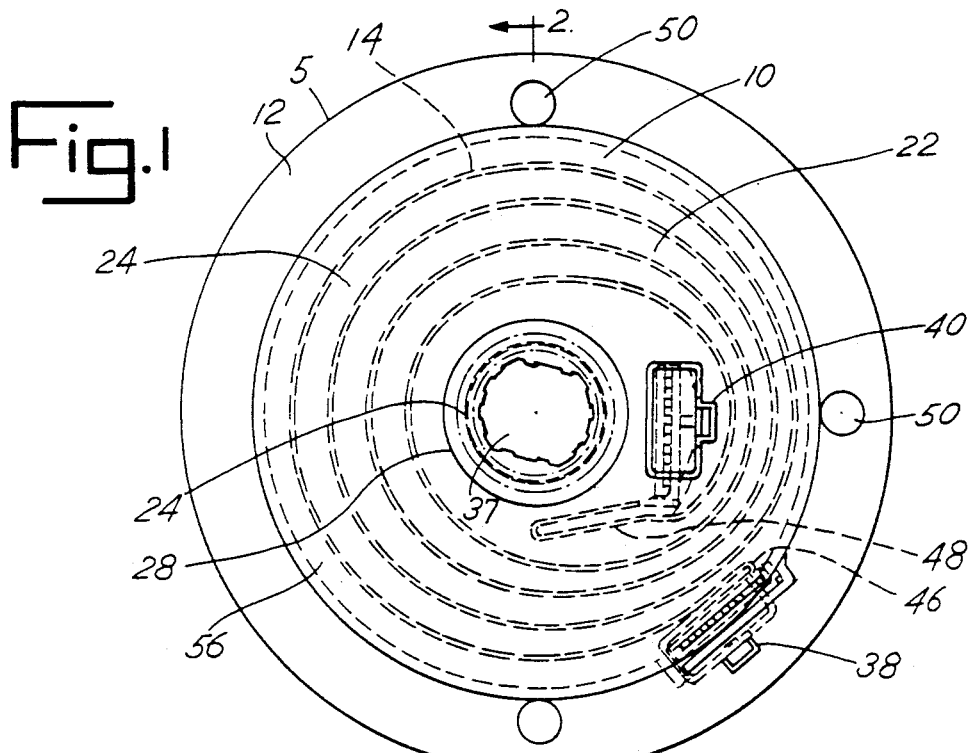
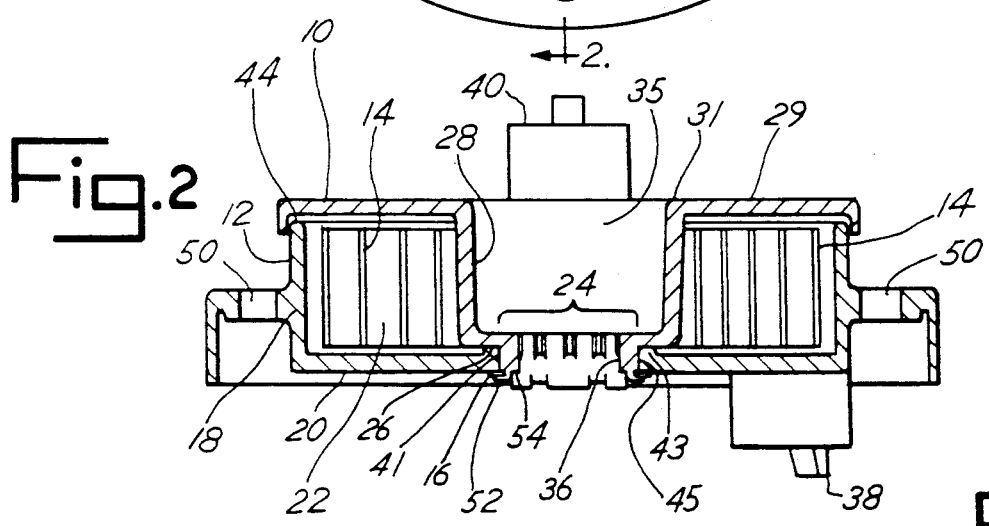
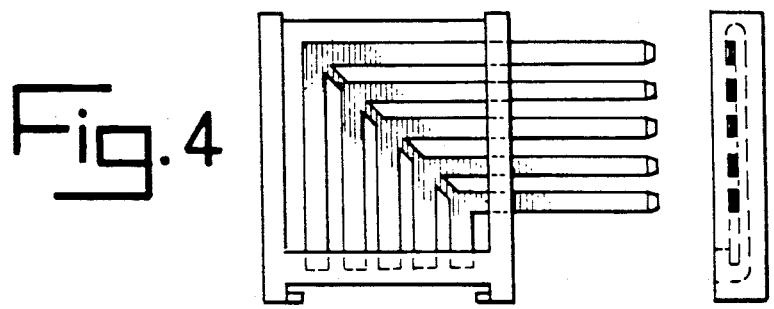

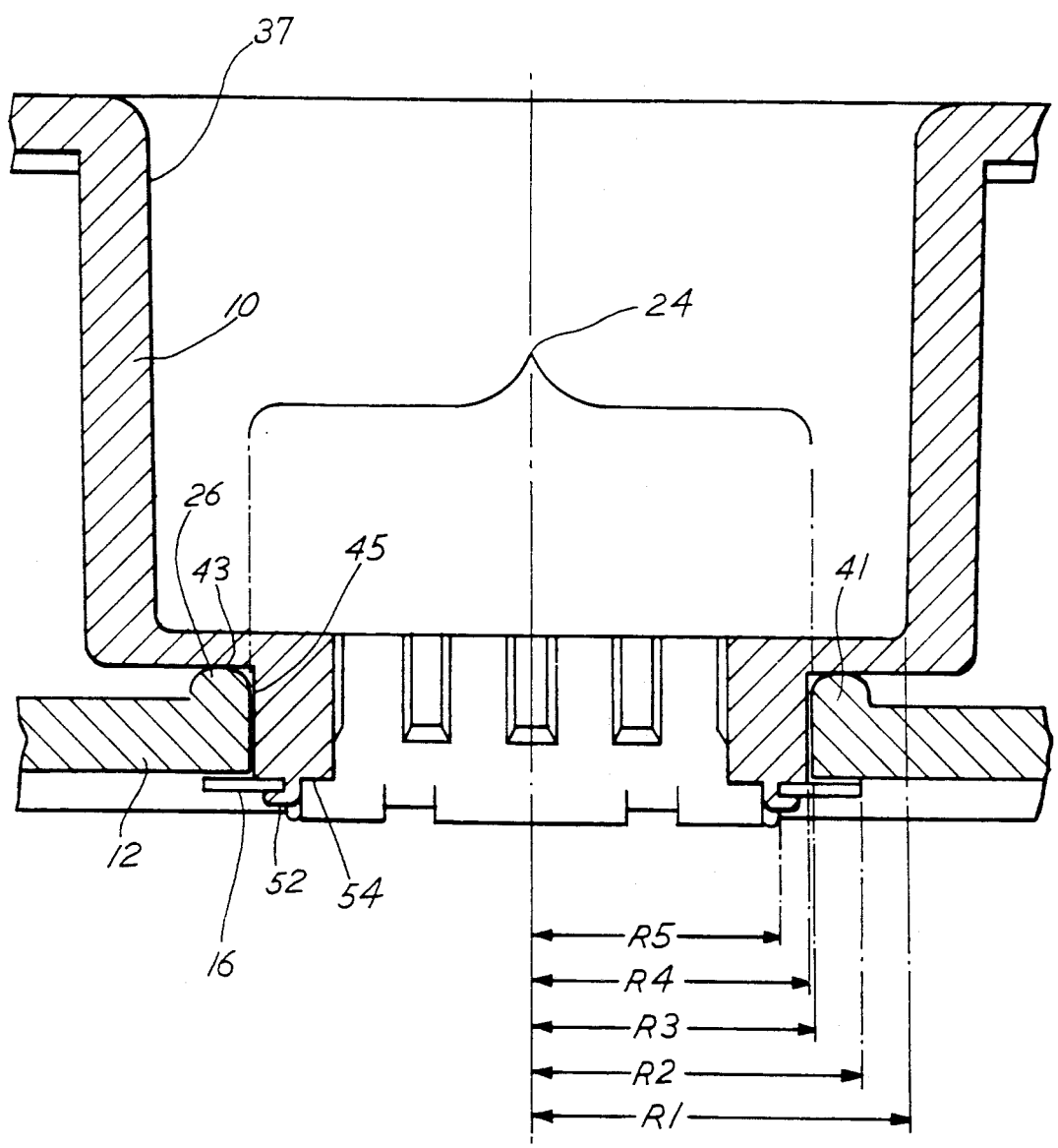

CLOCK SPRING HOUSING AND ASSEMBLY

BACKGROUND OF THE INVENTION

1. Field of the Invention

The invention is a clock spring housing for enclosing an electrical connector, the clock spring housing uniting a rotatable portion of the electrical connector to a stationary portion of the electric connector. This invention is also a clock spring assembly, that is the clock spring housing including the electrical circuit.

An increasing number of automobiles have air bag crash systems. An air bag is typically located on the steering wheel facing the driver. The air bag must be in continuous electrical connection with sensors in the car body. The sensors provide an electrical signal to the air bag crash assembly which instantly inflates the air bag in the event of a crash.

Accordingly, there is a need for an electrical connection between the rotatable portion of the air bag assembly which is mounted on the steering wheel, and the remaining portion of the assembly which is in a stationary position in the car body. Electrical connections between rotatable and stationary parts are well known. Typically, an electrical brush rests upon a conductive ring, with one of the parts being rotatable to provide such rotatable electrical connection. However, there is a risk, particularly during the impact of an accident, of a transient failure of electrical connection with a brush and ring system, which would result in failure of the entire air bag system crash assembly.

Accordingly, a clock spring interconnector has been previously developed, comprising an outer housing and a rotor member, the housing and rotor member rotatably associated with one another at a plurality of bearing surfaces. A "clock spring" is located inside the interconnector, the clock spring conductively attached at both ends to conductor wires which pass out of the interconnector to unite the air bag to the sensing device. The interconnector is mounted on the steering column, and the steering wheel may be rotated in either direction while a continuous, positive electrical connection is provided between air bag and sensors via the clock spring interconnector.

While prior art clock spring interconnectors are effective to provide the necessary continuous electrical connection between an air bag or other device on a rotating column and a stationary portion of a circuit, the prior art systems are subject to noise, binding, and in some cases failure as a result of having a plurality of bearing surfaces working in concert.

2. Prior Art

U.S. Pat. No. 4,722,690 describes a clock spring interconnector which includes a projection for ensuring that the rotating portion of the clock spring assembly remains stationary during installation of the assembly onto a steering wheel. The assembly of the '690 patent comprises two bearing surfaces where the rotating portions of the assembly contacts the stationary assembly housing.

SUMMARY OF THE INVENTION

It is an object of this invention to provide a clock spring housing having a single bearing surface.

It is another object of this invention to provide a clock spring housing assembly that is constructed without an upper bushing.

It is yet another object of this invention to provide a clock spring assembly that is highly reliable and that operates with little noise.

This invention relates generally to a clock spring assembly. The assembly of this invention comprises a hub, a housing and a coiled conducting means. The housing includes a first radial depression having a circular first aperture. The hub includes a second radial depression and a second aperture extending though the first aperture and having a circular outer dimension of smaller radius than the radius of the first circular aperture. The hub is rotatably associated with the housing by means of a radial bearing. The hub is united with the housing by means of a locking device. The united hub and housing defines a clock spring enclosure, the first and second radial depressions combine in the clock spring enclosure to define a radial space. The radial space is occupied by the coiled conducting means. The coiled conducting means has a first and second end with the first end of the coiled conducting means being conductively attached to a first connector which extends through the housing while the second end of the coiled conducting means is conductively attached to a second connector which extends through the hub.

In another embodiment, this invention is a clock spring assembly comprising a hub, a housing, a retaining ring and a coiled conducting means. The housing comprises a first radial wall perpendicularly attached to a base. The base of the housing containing a first radial depression having a circular first aperture. The hub comprises a second radial wall perpendicularly attached to the inside dimension of an annular ring to define both a second radial depression, and a second aperture extending through the first aperture. The second aperture has a circular outer dimension having a smaller radius than the radius of the first circular aperture. The hub is rotatably associated with the housing by means of a radial bearing located where the first aperture contacts the circular outer dimension of the second aperture. The hub is united with the housing with a retaining ring having an inner radius smaller than the circular outer radius of the second aperture, and an outer radius slightly larger than the circular radius of the first aperture. The retaining ring is held frictionally in contact with the base of the housing and the bottom dimension of the second aperture by a plurality of stakes perpendicularly attached to the bottom dimension of the second aperture. The united hub and housing defines a clock spring enclosure. The first and second radial depressions of the clock spring enclosure combine to define a radial space which is occupied by the coiled conducting means. The coiled conducting means has a first and a second end. The first end of the coiled conducting means is conductively attached to a first connector which is accessed through the housing while the second end of the coiled conducting means is conductively attached to a second connector which is accessed through the hub.

DESCRIPTION OF THE DRAWINGS

In the drawings:

FIG. 1 is a top view of the clock spring assembly of this invention;

FIG. 2 is a side view of a clock spring assembly of this invention;

FIG. 3 is a blow-up side view of the radial bearing portion of a clock spring assembly of this invention; and FIGS. 4 and 5 are views of an integral connector which may be used in a preferred embodiment of the clock spring assembly of this invention.

DESCRIPTION OF THE PREFERRED EMBODIMENTS

To summarize, the present invention relates to an improved clock spring assembly.

The clock spring assembly of this invention is better understood by reference to FIGS. 1-5 which show various aspects of a preferred clock spring assembly embodiment of this invention. Like elements are identified by the same number in the various figures.

FIGS. 1 and 2 show top and side views respectively of the clock spring assembly 5 of this invention. The clock spring assembly 5 comprises a hub 10 and a housing 12. The housing comprises a first radial wall 18 perpendicularly attached to a base 20. The first radial wall 18 has a housing lip 44 which is located on the dimension of the first radial wall 18 opposite that of its perpendicular attachement to the base 20.

The base 20 and the first radial wall 18 combine to define the housing 12 having a circular depression 22 with a circular first aperture 24 located in the base 20 of the housing 12. The first aperture 24 includes an aperture lip 26. The housing 12 may also include one or more mounting means 50.

The hub 10 of the clock spring assembly 5 includes a second radial wall 28, and an annular ring 29 having an inside dimension 31 and an outside dimension 33. The second radial wall 28 is perpendicularly attached to the inside dimension 31 of the annular ring 29. The second radial wall 28 in combination with the annular ring 29 defines a second circular depression 35 which includes a walled second aperture 37. The walled second aperture 37 has a circular outer dimension 33 with radius smaller than that of the circular first aperture 24. The walled second aperture 37 also has an inner dimension 36.

The hub 10 of the clock spring assembly 5 is rotatably associated with the housing 12 by means of a single radial bearing 41. The radial bearing 41 has a first bearing surface 43 perpendicularly associated with a second bearing surface 45. Both bearing surfaces are radial in dimension and located at the points where the aperture lip 26 of the circular first aperture 24 contacts the circular outer dimension 33 of the walled second aperture 37.

The hub 10 and the housing 12 are united using a locking means. The preferred locking means comprising a retaining ring 16 having an inner radius smaller than the circular outer dimension 33 of the walled second aperture 37. The retaining ring 16 also has an outer radius slightly larger than the radius of the first aperture 24. The retaining ring 16 is frictionally held into place by a plurality of stakes 52 which are perpendicularly attached to the bottom dimension of the second aperture 54.

A radial clock spring enclosure 56 is defined by the hub 10 united with the housing 12 by means of the retaining ring 16. The radial clock spring enclosure 56 contains the coiled conducting means 14. The coiled conducting means has a first end 46 and a second end 48. The first end 46 of the coiled conducting means 14 is conductively attached to a first connector 38 which extends through the housing 12. The second end 48 of the coiled conducting means 14 is conductively attached to a second connector 40 which extends through the hub 10.

FIG. 3 is a closeup view of the single radial bearing 41 of the clock spring assembly of this invention. The single radial bearing 41 is located where the hub 10 is rotatably united with the housing 12 by means of retaining ring 16. The single radial bearing 41 of the clock spring assembly is located at the points where the circular first aperture 24 and aperture lip 26 contact the circular outside dimension 33 of the walled second aperture 37 at first bearing surface 43 and second bearing surface 45.

The single radial bearing 41 and the preferred locking means for uniting the hub 10 with the housing 12 are better understood by reference to the various radius of the components making up the first radial bearing 41. The hub 10 needs a second depression 35 which has a radius R1. The housing 12 contains a circular first aperture 24 which has a radius R3. The hub 10 contains a walled second aperture 37 which has a circular outer dimension 33 having a radius R4. Radius R3 of the circular first aperture is only slightly greater than radius R4 of the circular outer dimension of the walled second aperture 37. This enables the second walled aperture 37 to be snugly fit into the circular first aperture 24. This snug fit creates the single radial bearing 41. The single radial bearing 41 further comprises a first bearing surface 43 and a second bearing surface 45 at which portions of the hub 10 and the housing 12 are in constant frictional contact with one another. The hub 10 and housing 12 are united in the proximity of the single radial bearing 41 by a retaining ring 16. The retaining ring 16 has a outer radius R2 and an inner radius R5. The outer radius R2 of the retaining ring 16 is greater than the radius R3 of the circular first aperture 24. The inner radius R5 of the retaining ring 16 is smaller than the radius R4 of the circular outer dimension 33 of the walled second aperture 37. The retaining ring 16 spans both the first aperture 24 and the second aperture 37 when it is located in a position in the proximity of the radial bearing 41. The circular retaining ring 16 is frictionally held into place by a plurality of stakes 52. Each stake 52 is perpendicularly associated with the bottom dimension 54 of the walled second aperture 37.

FIGS. 4 and 5 show an integral connector useful as the first and second connectors 38 and 40 respectively, of this invention. FIG. 4 depicts a side view of the connector. FIG. 5 depicts an end view of a connector.

The clock spring assembly of this invention includes a hub, rotatably attached to a housing by a retaining ring. The clock spring assembly contains a single bearing which provides for the rotation of the hub while the housing remains stationary. A coiled conducting means is located in a radial clock spring enclosure defined by the combination of the hub and the housing. The radial clock spring enclosure contains a coiled conducting means having a first end and a second end. The first end of the coiled conducting means is conductively attached to a first connector while the second end of the coiled conducting means is conductively attached to a second connector.

The clock spring assembly of this invention includes a hub. The hub comprises a radial wall perpendicularly attached to the inner radius of an annular ring. The outer radius of the annular ring contains a shoulder. The combination of the second radial wall and the radial ring defines a depression. A walled aperture having an inner radius and an outer radius is located in the depression. Stakes integral to the bottom dimension of the walled aperture of the hub and perpendicularly associated thereto secure a retaining ring into place at the location where the hub is rotatably attached to the housing. The purpose of the retaining ring is to act as means to lock the hub to the housing. Finally, the hub contains a means connecting a conducting means to the second end of the coiled conducting means.

The walled aperture of the hub is perpendicularly associated with the bottom radial dimension of the second aperture depression. The purpose of this perpendicular association is to provide a location at which the first aperture dimensions can contact the second aperture dimensions to define a radial bearing surface. The hub rotates on the radial bearing surface while the housing remains stationary. Therefore, the outer dimension of the second aperture must be circular. Additionally, the dimension of the first aperture must be circular to allow for the rotation of the hub. The inside dimension of the second aperture, however, need not be circular. It is preferred that the dimension form a double-D. The double-D inner dimension of the second aperture acts as a keyway which fits on a steering column or the like in a particular orientation. Having such a keyway eliminates the need for a person installing the clock spring assembly on, for example, a steering column to pay attention to the exact position of the clock spring assembly thereon.

The second aperture also has a bottom dimension. It is preferred that the bottom dimension of the second aperture is flush with the base of the housing when the hub and housing are rotatably attached to one another with a locking means. It is important that the bottom dimension of the second aperture is flush with the base of the housing because the preferred retaining ring extends across both a portion of the bottom dimension of the second aperture and a portion of the base of the housing. The retaining ring is then held into place by a plurality of stakes perpendicularly attached to the bottom dimension of the second aperture.

The hub also includes a second connector which is associated with the second end of the coiled conducting means. The second connector may be any means available for conductively attaching the second end of the coiled conducting means with an electrical connector which extends through the hub of the clock spring assembly. The second connector may be a wire which passes through the housing, it may be a plug-type connection, or any other connection which is capable of the aforementioned conductive attachment. It is preferred that the second connector is an integral connector that is capable of accepting a male or a female plug type fitting. Preferably, the integral connector is a female fitting capable of accepting a male plug. The second connector is usually conductively united with a rotating device. When the device rotates the second connector also rotates in conjunction with the hub. The rotation of the hub causes the coiled conducting means to tighten or relax, much like a watch spring. The first end of the coiled conducting means remains in stationary conductive contact with the first connection during the rotation.

The clock spring assembly of this invention also includes a housing. The housing further includes a first radial wall perpendicularly attached to a base. The combination of the radial wall and the base forms a circular depression having a first circular aperture located therein. As previously mentioned, it is important that the first aperture is circular so that it may combine with the walled second aperture of the hub to form a radial bearing surface. The first circular aperture may have a lip. The purpose of the lip is to minimize the area of the radial bearing surface.

The housing may further include an integral mounting means. The purpose of the mounting means is to provide a way to fix the housing into place so that it cannot be rotated. The mounting means essentially fixes the housing into place while the hub is allowed to rotate the about the radial bearing in relation to the housing. It is preferred that the mounting means is a plurality of holes to allow for securing the clock spring assembly to some type of stationary surface by means of a screw or other attaching device.

The housing further includes a first connector, the first connector and the second connector being essentially identicalin function, except that the first connector remains stationary when the rotating device attached to the second connector is rotated.

When the hub and housing are rotatably united at the single radial bearing surface by means of the retaining ring, a radial clock spring enclosure is formed. The purpose of the radial clock spring enclosure is to hold the coiled conducting means, to provide a location where the first end and second end of the coiled conducting means is attached to a first connector and a second connector, and to provide enough space to allow for the rotation of the hub in relation to the housing while maintaining conductance between the coiled conducting means and the first and second connector. The coiled conducting means is located in the radial clock spring enclosure. Preferably, the coiled conducting means is resilient enough to allow the hub to rotate at least two complete turns in any direction from a center rotational position while maintaining conductance between the first and second conductor via the coiled conducting means.

The coiled conducting means may be any type of conducting means capable of maintaining an electrical connection between the first and second connectors. The coiled conducting means may be coiled metal foil, a coiled wire, or any other coiled or resilient conducting means. Preferably, the coiled conducting means is about 8 to about 14 feet in length or longer and is made up of an insulated conducting tape. It is preferred that the conducting tape be made up of a conducting material such as copper or any other conducting material sandwiched between mylar. The first end and second end of the coiled conducting means are conductively attached to the first connector and second connector respectively to provide for the conductive connection between the first and second connector. Any method known in the art such as welding, soldering the like may be utilized to attach the coiled conducting means to the first and second connector.

The description above has been offered for illustrative purposes only, and is not intended to limit the scope of the invention of this application which is defined in the claims below.

What is claimed is:

1. A clock spring assembly comprising; a hub, a housing, and a coiled conducting means, the housing including a first radial depression having a circular first aperture, the hub including a second radial depression, and second aperture extending through the first aperture, the second aperture having a circular outer dimension of smaller radius than the first circular aperture, the hub rotatably associated with the housing by means of a single radial bearing and the hub united with the housing with a locking means, the united hub and housing defining a clock spring enclosure, the first and second radial depressions combining in the clock spring enclosure to define a radial clock spring enclosure which is occupied by the coiled conducting means the coiled conducting means including a first and second end, the first end conductively attached to a first connector which extends through the housing, and the second end conductively attached to a second connector which extends through the hub.

2. The clock spring assembly of claim 1 further characterized in that the locking means comprises a retaining ring having an inner radius smaller than the circular outer radius of the second aperture, and an outer radius slightly larger than the circular radius of the first aperture, the retaining ring held fictionally in place by a plurality of stakes perpendicularly attached to the bottom dimension of second aperture.

3. The clock spring assembly of claim 1 further characterized in that the radial bearing is located where the first aperture contacts the second aperture.

4. The clock spring assembly of claim 1 further characterized in that the second aperture has a non-circular inner dimension.

5. The clock spring assembly of claim 4 further characterized in that the non-circular inner dimension of the second aperture is double-D shaped.

6. The clock spring assembly of claim 1 further characterized in that the connector means is an integral connector.

7. A clock spring assembly comprising; a hub, a housing, a retaining ring, and a coiled conducting means, the housing comprising a first radial wall perpendicularly attached to a base, the housing defining a first radial depression having a circular lipped first aperture, the hub comprising a second radial wall perpendicularly attached to the inside dimension of an annular ring to define a second radial depression, and second aperture, the second aperture extending through the first aperture and having a circular outer dimension of smaller radius than the first circular aperture, the hub rotatably associated with the housing by means of a radial bearing located where the first aperture contacts the second aperture, the hub united with the housing with a locking means comprising a retaining ring having an inner radius smaller than the circular outer radius of the second aperture, and an outer radius slightly larger than the circular radius of the first aperture, the retaining ring held fictionally in place by a plurality of stakes perpendicularly attached to the second aperture, the united hub and housing defining a clock spring enclosure, the first and second radial depressions combining in the clock spring enclosure to define a radial space which is occupied by the coiled conducting means which has a first and second end, the first end of the coiled conducting means conductively attached to a first connector which extends through the housing, and the second end of the coiled conducting means conductively attached to a second connector which extends through the hub.

* * * * *